W. Garlin,
Rotary Steam Valve.
Nº 2,298.     Patented Oct. 11, 1841.
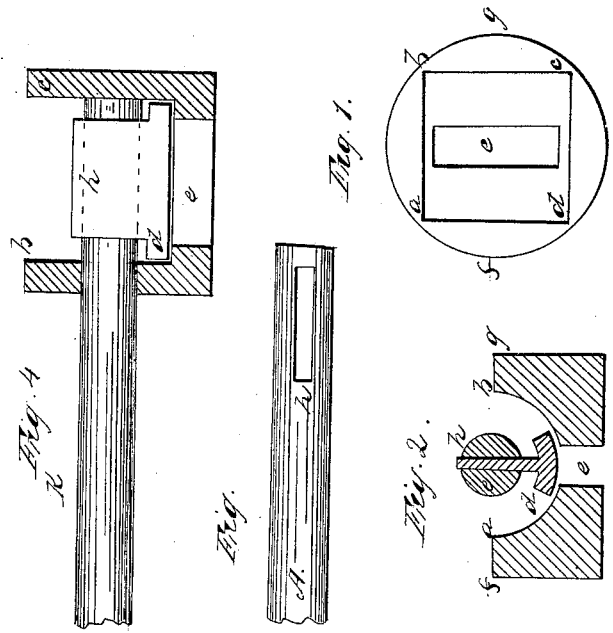
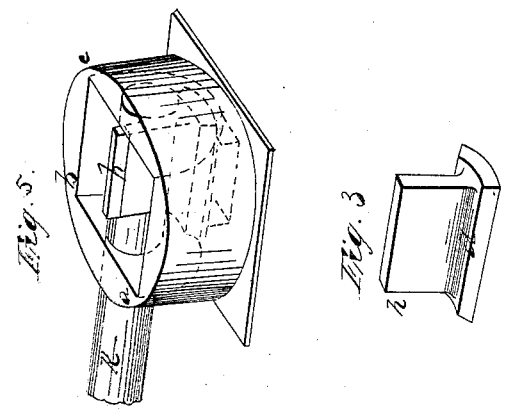

UNITED STATES PATENT OFFICE.

WILLIAM GARLIN, OF PROVIDENCE, RHODE ISLAND.

REGULATING OR THROTTLE VALVE OF STEAM-ENGINES.

Specification of Letters Patent No. 2,298, dated October 11, 1841.

*To all whom it may concern:*

Be it known that I, WILLIAM GARLIN, of Providence, in the county of Providence and State of Rhode Island, have invented a new and Improved Method of Constructing Valves to be Applied as Throttle or Regulating Valves to Steam-Engines; and I do declare that the following is a full and exact description.

The nature of my invention consists in the peculiar construction of the valve, and its connection with the stem, or rod by which it is moved.

To enable others skilled in the art to make, and use my invention, I will proceed to describe its construction.

I construct a chamber (to contain the valve) the plan of which is shown (on the accompanying drawing) by the quadrangle $a.\ b.\ c.\ d.$ at No. 1; the parallelogram $e$, represents the plan of the aperture in the chamber, over which the valve is placed; the bottom of the chamber is concave, and the sides $a$, $b$, and $c$, $d$ are semi-circular in their elevation. A section is shown of this chamber at No. 2, $f$, $a$, and $b$, $g$, the chamber; $d$, the valve; $h$, the stem of the valve, passing through a slot in the rod $c$. A perspective view of the valve is shown at No. 3; the letters referring same as No. 2. A longitudinal section of the chamber, valve, and rod, is shown at No. 4, $k$ represents the rod through which the stem of the valve passes, and by which it is made to move on its semi-circular seat either opening, or shutting the aperture $e$. No. 5, is a perspective view, the chamber is supposed transparent, that the connection of the valve with the rod $k$, and its place over the aperture $e$, may be more plainly shown; the rod $k$, has a slot passing diametrically through it, as shown at $h$, or Fig. A; the letters in No. 5, refer to the same parts, as the same letters do in Nos. 1 and 4.

The operation of this valve is as follows— namely, the slot through the rod $k$, must be as perfect as possible; the stem of the valve to fit into it, so as to allow the valve to move freely in the slot by its gravity; the chamber should be placed (if convenient) so, as to allow the valve to rest on its seat by its own weight, as well as by the pressure of the steam;—thus as the valve wears it settles through the slot, and is pressed closely to its seat, thus preventing any leakage of steam.

What I claim as my invention and desire to secure by Letters Patent is—

The manner of connecting the valve $d$, with the rod $k$, so as to adjust itself to the seat (on which it moves) by the stem $h$, passing up or down through the slot in the rod, as the case may be, the whole combined as herein set forth.

WILLIAM GARLIN.

Witnesses:
    FRANCIS W. GARLIN,
    CHARLES F. PIKE.